United States Patent [19]
Bülow

[11] Patent Number: 5,903,384
[45] Date of Patent: May 11, 1999

[54] WAVELENGTH CONVERTER SUITABLE FOR HIGH BIT RATES

[75] Inventor: Henning Bülow, Stuttgart, Germany

[73] Assignee: Alcatel Alsthom Compagnie Generale D'Electricite, Paris, France

[21] Appl. No.: 08/938,286

[22] Filed: Sep. 26, 1997

[30] Foreign Application Priority Data

Sep. 28, 1996 [DE] Germany ............... 196 40 070

[51] Int. Cl.$^6$ .................................................. G02F 1/39
[52] U.S. Cl. ............................................. 359/332; 359/326
[58] Field of Search ............................ 359/326–332; 385/122; 372/21, 22

[56] References Cited

U.S. PATENT DOCUMENTS

| | | | |
|---|---|---|---|
| 5,005,166 | 4/1991 | Suzuki et al. .................... | 359/123 |
| 5,099,347 | 3/1992 | Daniele et al. .................. | 359/123 |
| 5,400,164 | 3/1995 | Kurtzke et al. ................. | 359/326 X |
| 5,604,618 | 2/1997 | Mori et al. ...................... | 359/326 X |
| 5,619,368 | 4/1997 | Swanson ......................... | 359/326 |
| 5,760,948 | 6/1998 | Bigo ............................... | 359/326 |

OTHER PUBLICATIONS

"All Optical 1.5 $\mu$m to 1.3 $\mu$m Wavelength Conversion in a Walk–Off Compensating Nonlinear Optical Loop Mirror" IEEE Photonic Tech. Ltrs. vol. 7, No. 5, May 1995, pp. 497–499, by D. Mahgerefteh et al.

"System Performance of a Nonlinear Optical Loop Mirror Used as Demultiplexer for Bitrates of 40 Gbit/s and Beyond" Proceedings SPIE, vol. 2449, 1995, pp. 158 –167, by H. Büow, et al. [No Month].

*Primary Examiner*—John D. Lee
*Attorney, Agent, or Firm*—Ware, Fressola, Van der Sluys & Adolphson LLP

[57] ABSTRACT

A wavelength converter is disclosed having a Sagnac interferometer (NOLM, nonlinear optical loop mirror) as its essential part. In order that the wavelength converter can also be used for NRZ (nonreturn-to-zero) signals, it has a 3×3 coupler (2) with six ports (6–11).

8 Claims, 2 Drawing Sheets

WAVELENGTH CONVERTER SUITABLE FOR HIGH BIT RATES

TECHNICAL FIELD

This invention relates to a wavelength converter for converting signal light for a first wavelength to light of a second wavelength.

BACKGROUND OF THE INVENTION

Such a wavelength converter is shown, for example, in an article by D. Mahgerefteh et al, "All-Optical 1.5 µm to 1.3 µm Wavelength Conversion in a Walk-Off Compensating Nonlinear Optical Loop Mirror", IEEE Photonics Technology Letters, Vol. 7, No. 5, May 1995, pages 497 to 499. This wavelength converter, which is shown in FIG. 2, has as its central part a nonlinear optical Sagnac interferometer (nonlinear optical loop mirror, NOLM). A fiber composed of a single-mode fiber (3.58 km SM Fiber) and a dispersion-shifted fiber (2.6 km DS Fiber) is formed into a ring with the aid of a 2×2 coupler, i.e., a coupler with four ports. At one of the two ports not used for this purpose, light emitted by a laser (1.3 µm Clock) is coupled into the NOLM, which propagates in the NOLM clockwise and counter-clockwise. Connected to the other of these two ports of the coupler is a photodetector. Through a further coupler (WDM), signal light (1.5 µm Data) is coupled into the NOLM in such a way as to propagate in the NOLM clockwise. In the absence of signal light (1.5 µm Data), the light components propagating in opposite directions (1.3 µm Clock) are subject to the same propagation conditions. In the coupler, the two light components (1.3 µm Clock) interfere constructively, and they exit at the port where the light (1.3 µm Clock) is injected. The signal light (1.5 µm Data) may unbalance the NOLM; then, a portion of the light (1.3 µm Clock) will exit at the port of the coupler where no light (1.3 µm Clock) is injected. The signal light (1.5 µm Data) thus determines when light (1.3 µm Clock) exits at this port. The photodetector detects the light (1.3 µm Clock) carrying the information of the signal light (1.5 µm Data).

From H. Bülow et al, "System Performance of a Nonlinear Optical Loop Mirror Used as Demultiplexer for Bitrates of 40 Gbit/s and Beyond", Proceedings SPIE, Vol. 2449, 1995, pages 158 to 167, use of a NOLM as a demultiplexer is known, the demultiplexer being fed with an RZ (return-to-zero) data signal. Also known from this publication is a measure which indicates how well a 1 bit and a 0 bit at an output can be distinguished from one another; this measure is defined as a ratio of the powers of a 1 bit and a 0 bit (extinction ratio, ER). This ratio ER follows from a parameter describing this NOLM, namely the transmission T, which is a function of a phase difference Δφ. If only signal light propagates in the NOLM, the transmission is zero. In FIG. 5 (Bülow), the transmission T is shown as a function of the phase difference Δφ.

The ratio ER should have as high a value as possible, e.g., ER>10 dB. In addition, such a high value should be reached with as little optical input power as possible. Theoretical considerations (Bülow) and measurements on known wavelength converters using a NOLM have shown that for NRZ (nonreturn-to-zero) signals, the ratio ER≅dB and is thus too small to obtain a usable output signal and achieve wavelength conversion.

SUMMARY OF THE INVENTION

The object of the invention is to provide a wavelength converter whose operation is independent of signals applied to it. A specific object is a wavelength converter for converting signal light of a first wavelength to light of a second wavelength, wherein an optical fiber as well as a first coupler and a second coupler are provided, wherein a first end of the optical fiber is connected to a first port of the first coupler, and a second end of the optical fiber is connected to a second port of the first coupler, wherein a third port of the first coupler is feedable with light of the second wavelength, which the first coupler couples into the optical fiber, wherein light of the second wavelength having a waveform corresponding to that of the signal light can exit at a fourth port of the first coupler, and wherein the signal light of the first wavelength is injectable into the optical fiber through the second coupler, which is inserted in the optical fiber, wherein the first coupler is a coupler with six ports which distributes the light of the second wavelength among the first port, the second port, and a fifth port.

One advantage of the invention is that the wavelength converter, besides being suitable for high-bit-rate signals and independent of the signals applied to it, also meets the requirement of low optical power for the signal light. Another advantage of the invention is that the light emerging from the wavelength converter is present as an inverted or noninverted signal.

BRIEF DESCRIPTION OF THE DRAWINGS

The invention will now be explained in more detail, by way of example, with reference to the accompanying drawings, in which.

BEST MODE FOR CARRYING OUT THE INVENTION

In the following, two embodiments of a wavelength converter are described with the aid of schematic drawings. Thereafter, their operation and the basic idea of the invention, namely that wavelength conversion of NRZ signals is made possible by the use of a 3×3 coupler instead of a 2×2 coupler, will be explained in more detail.

Figure 1:
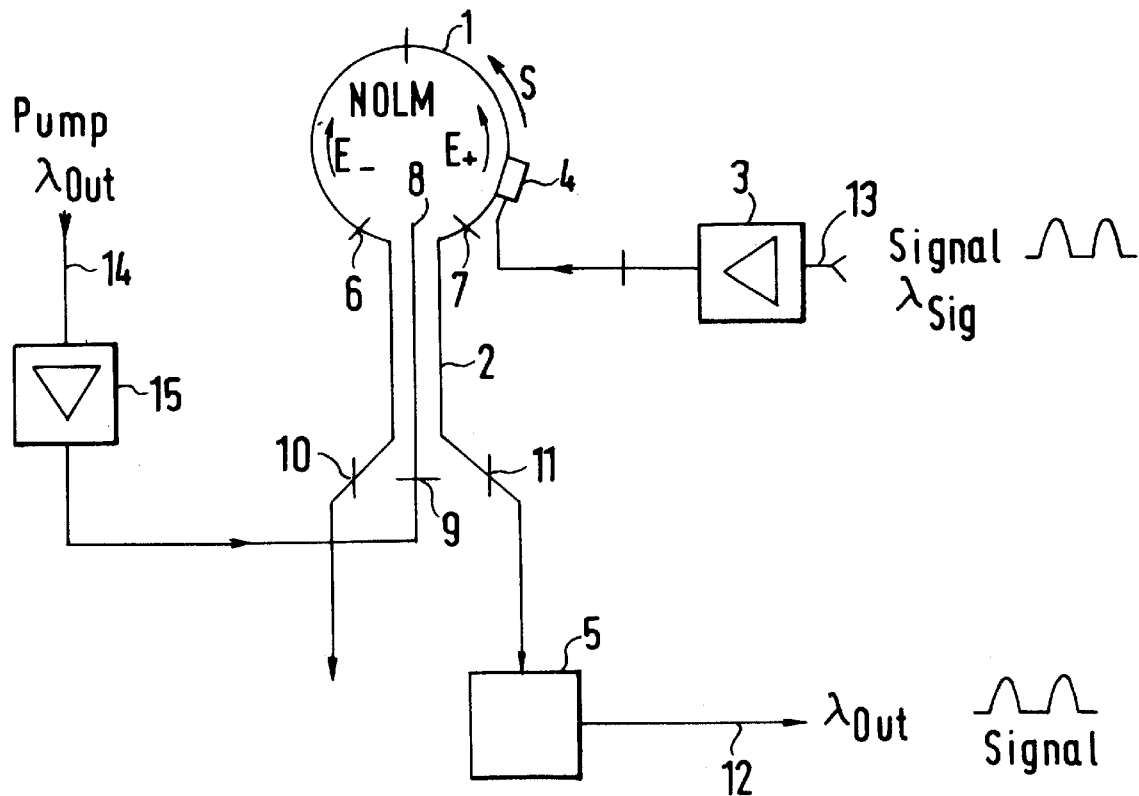
FIG. 1 shows a first embodiment of a wavelength converter.

FIG. 1 shows schematically one embodiment of a wavelength converter which has a fiber Sagnac interferometer as its central part; this Sagnac interferometer will hereinafter be referred to as NOLM (nonlinear optical loop mirror). Besides a fiber 1, the NOLM has two couplers 2, 4. The coupler 4 is inserted in the fiber 1 and serves to couple signal light modulated by a data signal into the fiber 1. The signal light is fed to an input 13, which is connected to the coupler 4 by a fiber. The fiber contains an optical amplifier 3 which amplifies the signal light if required. The signal light has a wavelength $\lambda_{Sig}$=1550 nm, for example. Further data on the signal light will be given in connection with FIG. 3.

Figure 2:
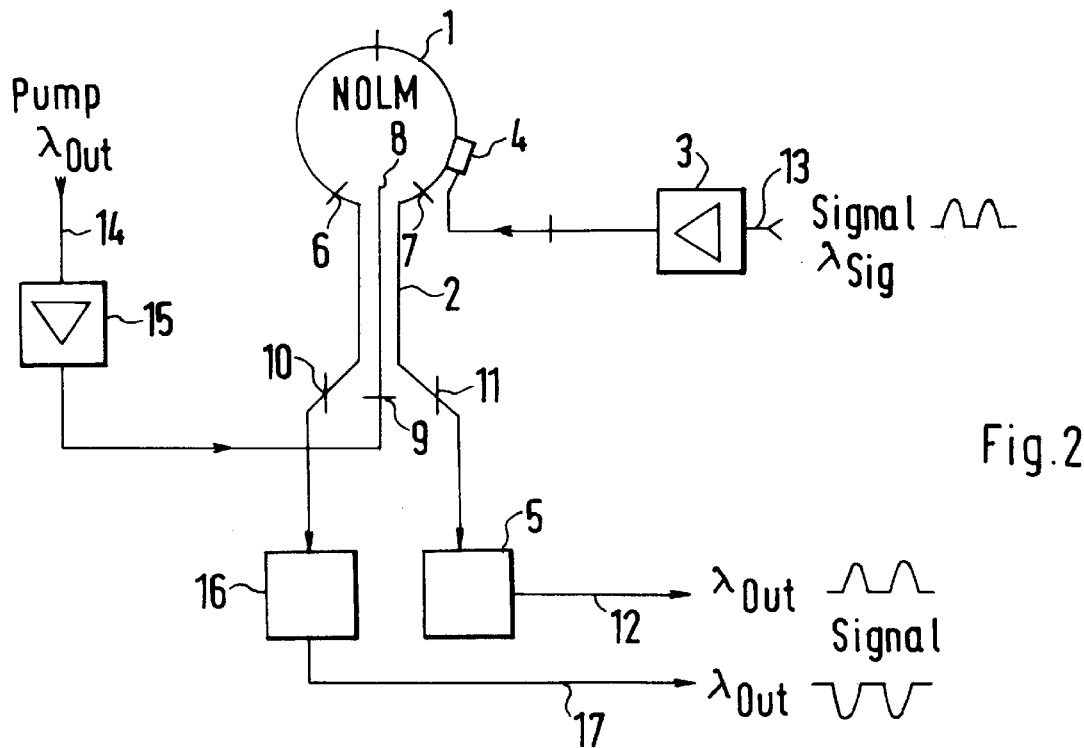
FIG. 2 shows another embodiment of a wavelength converter.

According to the invention, the coupler 2 is a 3×3 coupler, i.e., it has six ports 6 to 11. Through ports 6 and 7, the fiber 1 is formed into a ring; port 8 remains free. In FIGS. 1 and 2, ports 6, 7, 8 (NOLM side) are shown located opposite ports 9, 10, 11 (input and output ends). In the embodiment, port 9 is connected by a fiber to an optical amplifier 15, preferably a fiber-optic amplifier (EDFA, erbium-doped fiber amplifier). Under certain circumstances, the optical amplifier 15 may be omitted. An input 14 of the optical amplifier 15 can be fed with light which will hereinafter be referred to as pump light. A laser (not shown) emits the pump light with constant optical power; the pump light has a wavelength $\lambda_{Out}$=1532 nm, for example. With the optical amplifier 15, the pump light can be amplified to a desired value. Connected to port 11 is an optical filter 5 which blocks light of wavelength $\lambda_{Sig}$, so that only light of wavelength $\lambda_{Out}$ will appear at an output 12 of the optical filter 5.

In FIG. 1, a short signal section is shown at the input 13 and the output 12, and is designated there as "Signal". Pump light fed into the input 14 is designated there as "Pump". Also shown are reference characters E__, E_+, and S, which will be referred to in connection with FIG. 3.

The couplers 2, 4 and the optical fiber 1 are polarization-maintaining, i.e., light does not change its polarization during propagation in the couplers 2, 4 and the optical fiber 1. As a result, the wavelength converter is stable. If the pump light and the signal light are additionally coupled into the NOLM in such a way as to propagate in the optical fiber 1 along a common principal axis of polarization, the 0-bit and 1-bit states will be stable. The coupling of light into a principal axis of polarization of an optical fiber may be accomplished by the use of 90° splices, for example.

FIG. 2 shows a second embodiment of a wavelength converter, whose construction is basically the same as that of the embodiment of FIG. 1. Parts already shown in FIG. 1 are designated by like reference characters. The only difference from the wavelength converter of FIG. 1 is that port 10 of the coupler 2 is connected to an optical filter 16, which has the same properties as the optical filter 5. Otherwise the wavelength converter of FIG. 2 corresponds to the wavelength converter shown in FIG. 1; the parts used also have the same properties.

This embodiment of a wavelength converter has the advantage that in addition to wavelength conversion, signal inversion takes place: The light leaving the optical fiber 16 at an output 17 has a signal waveform which is inverted with respect to the signal waveform of the light at the output 12. The two signal waveforms are shown in FIG. 2 to illustrate this. By a suitable choice of the optical power for the signal light, an operating point can be set for the wavelength converter, i.e., there are two modes of operation for the wavelength converter, namely inverting and noninverting.

The optical filters 5, 16 serve to block signal light of wavelength $\lambda_{Sig}$. Alternatively to the use of optical filters at ports 10, 11, a wavelength-selective coupler (WDM) may be inserted in the optical fiber 1 in order to couple out signal light of wavelength $\lambda_{Sig}$ after interaction with the pump light has taken place. This possibility is known, for example, from the article by D. Mahgerefteh et al.

The operation of the wavelength converter will now be explained in more detail with the aid of FIG. 3 and with reference to FIG. 1.

Figure 3:
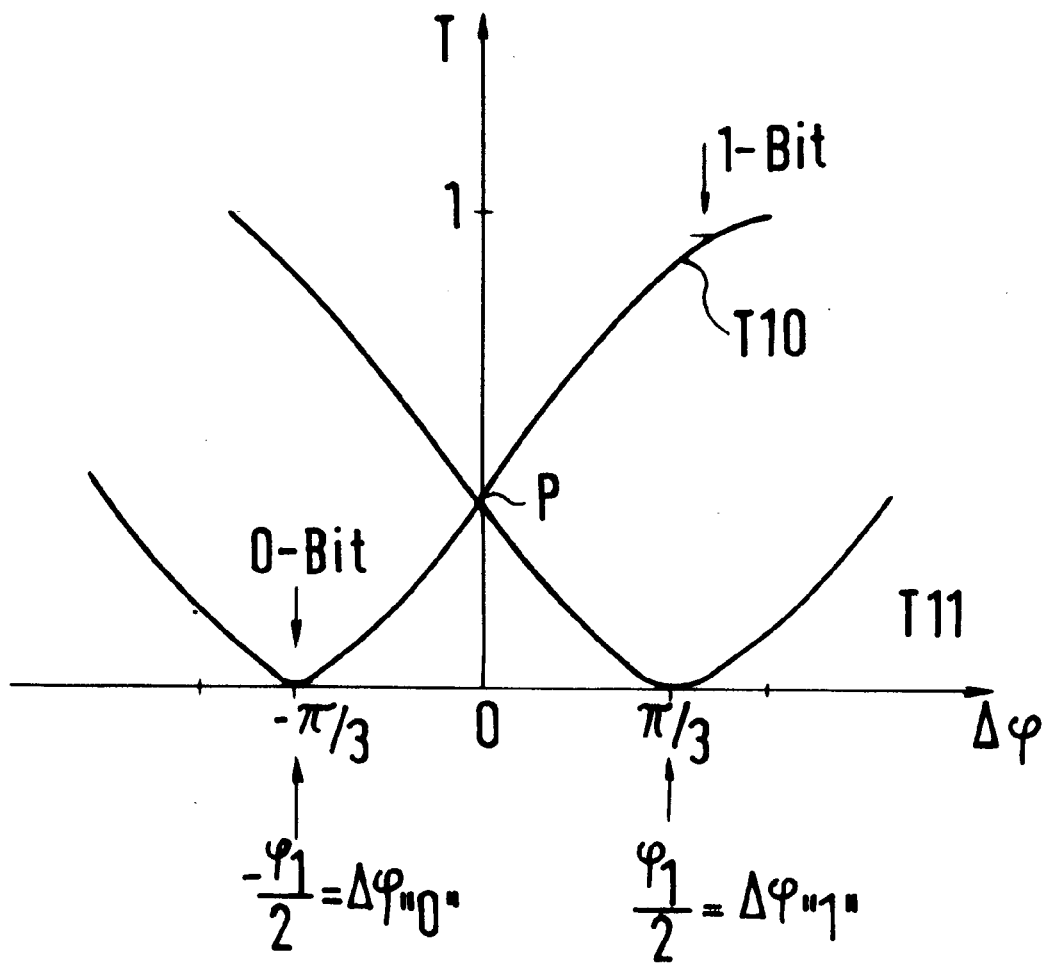
FIG. 3 shows a transmission chart for a 3×3 coupler as used in the invention.

FIG. 3 shows a schematic transmission chart of the coupler 2; the transmission T is shown as a function of the phase difference $\Delta\phi$. T10 designates the transmission for port 10, and T11 the transmission for port 11. The transmission T10 has a minimum (T10=0) at $-\pi/3$, and the transmission T11 has a minimum (T11=0) at $+\pi/3$. The two transmissions T10 and T11 intersect at $\Delta\phi=0$ at a point P of the ordinate.

In the optical fiber 1 shown in FIG. 1, several light components propagate: light components E__ and E_+, which result from the pump light and propagate in the optical fiber 1 in opposite directions, and a component S of the signal light. If no signal light is coupled into the optical fiber 1, the two light components E__ and E_+ are not phase-modulated and the phase difference $\Delta\phi$ after one circulation is 0 ($\Delta\phi=0$). The intensity of the light at the output is determined by the transmission T at point P.

An NRZ signal has, on an average, equal numbers of 1 bits and 0 bits. If the wavelength converter is fed with signal light which is an NRZ signal, on an average, the light component E__, which propagates in the opposite direction, will "see" the light component S with half the optical power of a 1 bit, since only 50% are 1 bits. Due to the Kerr effect, after one circulation the light component E__ will be delayed by a phase $\phi_1/2$. The signal light may be an NRZ signal in the form of a bit signal or an NRZ signal consisting of data packets. The light component E_+, which circulates in the same direction as the component S of the signal light, "sees" the entire optical power in the presence of a 1 bit, and no optical power in the presence of a 0 bit. Consequently, the light component E_+ is delayed by the phase $\phi_1$ in the presence of 1 bit and by $\phi=0$ in presence of a 0 bit. Thus the phase difference $\Delta\phi$ at the coupler 2 is $$\Delta\phi=(\text{delay of } E_+)-(\text{delay of } E\_)\text{ i.e.,}$$

$$\Delta\phi_{\text{"1"}}=\phi_1-\phi_1/2=\phi_1/2 \text{ for a 1 bit, and}$$

$$\Delta\phi_{\text{"0"}}=0-\phi_1/2=\phi_1/2 \text{ for a 0 bit.}$$

The phase shifts for a 1 bit and a 0 bit are equal in magnitude. However, since the transmissions T10 and T11 in FIG. 3 are each shifted by $\pi/3$ with respect to $\Delta\phi=0$, different transmissions result for a 1 bit and a 0 bit despite the equality in magnitude. This is shown in FIG. 3 for the transmission T10.

FIG. 3 also illustrates the above-mentioned inversion of the signal: if the transmission T10 at port 10 is approximately 1, the transmission T11 at port 11 is zero.

I claim:

1. A wavelength converter for converting signal light of a first wavelength ($\lambda_{Sig}$) to light of a second wavelength ($\lambda_{Out}$) wherein an optical fiber (1) as well as a first coupler (2) and a second coupler (4) are provided, wherein a first end of the optical fiber (1) is connected to a first port (6) of the first coupler (2) and a second end of the optical fiber (1) is connected to a second port (7) of the first coupler (2), wherein a third port (9) of the first coupler (2) is feedable with light of the second wavelength ($\lambda_{Out}$), which the first coupler (2) couples into the optical fiber (1), wherein light of the second wavelength ($\lambda_{Out}$) having a waveform corresponding to that of the signal light can exit at a fourth port (11) of the first coupler (2), and wherein the signal light of the first wavelength ($\lambda_{Sig}$) is injectable into the optical fiber (1) through the second coupler (4), which is inserted in the optical fiber (1), characterized in that the first coupler (2) is a coupler with six ports (6–11) which distributes the light of the second wavelength ($\lambda_{Out}$) among the first port (6), the second port (7), and a fifth port (8).

2. A wavelength converter as claimed in claim 1 wherein the optical fiber (1) and the first and second couplers (2, 4) are polarization-maintaining.

3. A wavelength converter as claimed in claim 2 wherein the signal light and the light of the second wavelength ($\lambda_{Out}$) are injectable in such a way as to propagate in the optical fiber (1) and in the first coupler (2) along a common principal axis of polarization.

4. A wavelength converter as claimed in claim 3 wherein the fourth port (11) of the first coupler (2) has a first optical filter (5) connected to it which passes coupled-out light of the second wavelength ($\lambda_{Out}$) and blocks coupled-out signal light of the first wavelength ($\lambda_{Sig}$).

5. A wavelength converter as claimed in claim 3 wherein a first optical filter (5) is connected to the fourth port (11) of the first coupler (2) and a second optical filter (16) is connected to a sixth port (10) of the first coupler (2), wherein the first and second optical filters (5, 16) pass coupled-out light of the second wavelength ($\lambda_{Out}$) and block coupled-out signal light of the first wavelength ($\lambda_{Sig}$), and wherein light of the second wavelength ($\lambda_{Out}$) passed by the first optical filter (5) has a signal waveform which is inverted with respect to the signal waveform of the light of the second wavelength ($\lambda_{Out}$) passed by the second optical filter (16).

6. A wavelength converter as claimed in claim 1 wherein a wavelength-selective coupler is inserted in the optical fiber (1) for coupling signal light of the first wavelength ($\lambda_{Sig}$) out of the optical fiber (1).

7. A wavelength converter as claimed in claim 1 wherein the fourth port (11) of the first coupler (2) has a first optical filter (5) connected to it which passes coupled-out light of the second wavelength ($\lambda_{Out}$) and blocks coupled-out signal light of the first wavelength ($\lambda_{Sig}$).

8. A wavelength converter as claimed in claim 1 wherein a first optical filter (5) is connected to the fourth port (11) of the first coupler (2) and a second optical filter (16) is connected to a sixth port (10) of the first coupler (2), wherein the first and second optical filters (5, 16) pass coupled-out light of the second wavelength ($\lambda_{Out}$) and block coupled-out signal light of the first wavelength ($\lambda_{Sig}$), and wherein light of the second wavelength ($\lambda_{Out}$) passed by the first optical filter (5) has a signal waveform which is inverted with respect to the signal waveform of the light of the second wavelength ($\lambda_{Out}$) passed by the second optical filter (16).

* * * * *